Aug. 7, 1956      D. A. HUGHES      2,758,189
CABLE SEAM SOLDERING APPARATUS
Filed May 11, 1955
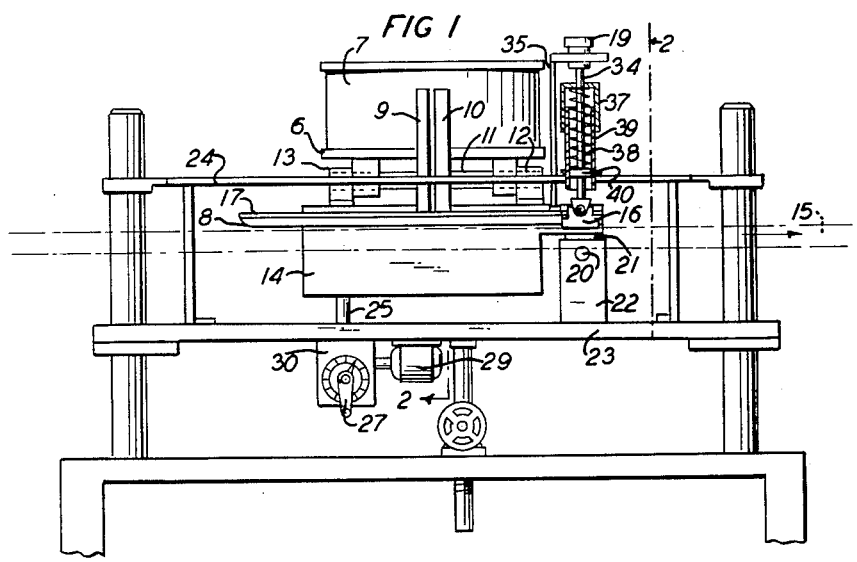
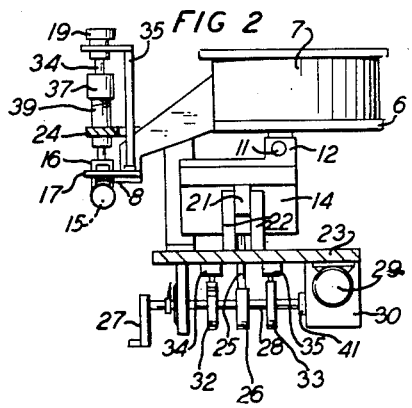
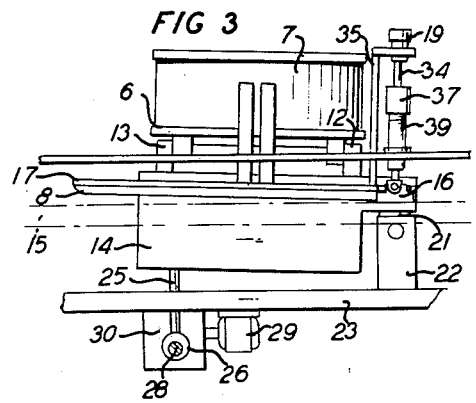
INVENTOR
D. A. HUGHES United States Patent Office 2,758,189
Patented Aug. 7, 1956

2,758,189

CABLE SEAM SOLDERING APPARATUS

David A. Hughes, Chatham, N. J., assignor to Western Electric Company, Incorporated, New York, N. Y., a corporation of New York Application May 11, 1955, Serial No. 507,625

7 Claims. (Cl. 219—12)

This invention relates to cable seam soldering apparatus and has for its object apparatus for positioning an induction heating coil used for the soldering operation.

In the manufacture of steel sheathed telephone cable such as the composite sheath cable disclosed in Patent 2,589,700 which issued March 18, 1952, to H. G. Johnstone, the longitudinally wrapped steel sheathing must be continuously soldered in order to provide a tight vapor barrier for the cable. While high temperatures are required for proper soldering, the heating of the cable must be controlled carefully in order to prevent charring of the cable insulation. Applicant's co-pending application 507,656, filed May 11, 1955 on "Soldering Apparatus for Cable Sheathing" is concerned primarily with the instantaneous cooling of the soldered cable sheathing and the prevention of arcing between the induction heating coil and the sheathing. Among the other problems encountered in the soldering operation are those of restarting the cable line after a stop without causing defects in the soldering (and without charring the cable insulation) and also that of controlling the spacing between the heating coil and the moving cable especially when the cable sheathing is uneven. The solution to these problems is complicated by the high currents required by the induction heating coil, about 500 amperes, which necessitates using large, relatively stiff conductor bars for connecting the coil to its step-down transformer which prevents independent movement of the coil.

In accordance with the general features of the invention, the transformer and induction heating coil are mounted on a common support which is movable about two axes, one lying in a plane parallel to that of the cable and the other axis at right angles thereto. A shoe which rides on the cable controls the positioning of the support about the parallel axis to maintain the coil at a substantially constant or fixed position from the cable in order to provide uniform heating for the cable. The support is moved about the other axis to tilt the coil as required for starting which allows the cable about to pass out from under the coil to be subjected to concentrated heating to insure proper soldering of its seam. It would not be possible to heat the cable over the entire length of the coil to such a high temperature, e. g. with the coil in a flat position, since this would burn the insulation of that part of the cable which would be subjected to the heat for the longer period of time.

These and other features of the invention will be more fully understood from the following detailed description taken in conjunction with the accompanying drawing, in which:

Fig. 1 is a front elevational view of the cable soldering apparatus incorporating the general features of the invention;

Fig. 2 is a side view of Fig. 1 taken along the plane of line 2—2, and

Fig. 3 is a partial front elevational view of the apparatus showing the heating coil in starting position.

Referring now to the drawing, in general the apparatus consists of an elongated induction heating coil 8 and its step-down transformer 7 mounted on a common support 6; the support 6 is hinged to a member 14 to be rotatable about an axis in a plane parallel to that of the cable. The support 14 in turn is hinged to a main support plate 23 so that it and, in turn, support 6 may be pivoted about an axis perpendicular to that of the cable. A shoe 16 which slides on the cable and a cam 26 are utilized for rotating the support 6 and the member 14 about the two axes.

More specifically, the elongated induction heating coil 8 is connected to the output terminal bars 9 and 10 of the transformer 7 which is mounted on the support 6. The support 6 is hinged to pivot about a pin 11 which extends through brackets 12 and 13 on member 14. Normally, while moving cable is being soldered, the pivot pin 11 and the coil 8 are substantially parallel with the cable. The location of the pivot pin is such that the support 6 is approximately balanced about the pivot. The support 6 is moved, to position the coil 8, by a shoe 16 on the cable exit end of the coil (in moving, the cable 15 passes from left to right as seen in Fig. 1) which is connected to an insulating stiffening plate 17 on the coil through a rod 34 and a bracket 35. The shoe 16 is spring tensioned by the device 39 fixed to a rigid member 24 to ride on the top of the cable and thereby exerts a positive force on the balanced support 6. The spring tensioning of the shoe may be adjusted by the screw-down member 37 which compresses the spring 38 to increase the force exerted on the member 40 attached to shaft 34. A thumb screw 19 on the top of the rod 34 may be adjusted for raising or lowering the coil 8 with respect to the shoe 16 on the cable.

The "tilt" adjustment for the coil is provided by hinging the member 14 about a pivot pin 20 which extends at right angles to the cable 15 through a bracket 21 extending downwardly from member 14 and brackets 22 extending upwardly from a main support plate 23. By tilting the coil, the pivot pin 11 for the support 6 is moved within a plane which is at right angles to the axis of pivot pin 20 and parallel to the cable. The coil may be tilted, for starting, or re-starting a stopped cable, as seen in Fig. 3, by a lifting member 25 which is actuated by the eccentric cam 26 mounted on the underside of plate 23. A handle 27 on shaft 28 for the cam may be used to rotate the cam manually or the cam shaft 28 may be driven by a motor 29 through a gear reducer 30, a slip clutch 41 being provided to permit the manual adjustment. A pair of cams 32 and 33 on shaft 28 are set to actuate limit switches 34 and 35 respectively for controlling the energizing and direction of rotation of the motor in case the motor drive is utilized.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Cable seam soldering apparatus comprising an induction heating coil, a step-down transformer having a secondary winding connected to the coil, a common support, rotatable about an axis lying in a plane parallel to the principal axis of the cable and also about an axis perpendicular to the cable, for the transformer and coil for holding the coil above the path of a moving cable, a shoe adapted to slide on the cable, means connected to the shoe for rotating the support about the parallel axis and means for tilting the support about the perpendicular axis.

2. Cable seam soldering apparatus comprising an induction heating coil, a step-down transformer having a secondary winding connected to the coil, a common support, rotatable about an axis lying in a plane parallel to the principal axis of the cable and also about an axis perpendicular to the cable, for the transformer and coil for holding the coil above the path of a moving cable, a shoe adapted to slide on the cable, adjustable spring tensioning means for holding the shoe in pressure contact on the cable, means connected to the shoe for rotating the support about the parallel axis and means for tilting the support about the perpendicular axis.

3. Cable seam soldering apparatus comprising an induction heating coil, a step-down transformer having a secondary winding connected to the coil, a common support, rotatable about an axis lying in a plane parallel to the principal axis of the cable and also about an axis perpendicular to the cable, for the transformer and coil for holding the coil above the path of a moving cable, a shoe adapted to slide on the cable, means connected to the shoe for rotating the support about the parallel axis and camming means for tilting the support about the perpendicular axis.

4. Cable seam soldering apparatus comprising an induction heating coil, a step-down transformer having a secondary winding connected to the coil, a fixed support plate, a member pivoted on the fixed plate for tilting about an axis perpendicular to that of the cable, a common support for the transformer and coil for holding the coil above the path of a moving cable, said support being pivotally connected to the tilting member to permit rotation of the support about an axis perpendicular to the tilting axis and which lies in a plane parallel to the principal axis of the cable, means for pivoting the support to hold the coil at a predetermined distance from the cable and means for tilting the pivoted member.

5. Cable seam soldering apparatus comprising an induction heating coil, a step-down transformer having a secondary winding connected to the coil, a fixed support plate, a member pivoted on the fixed plate for tilting about an axis perpendicular to that of the cable, a common support for the transformer and coil for holding the coil above the path of a moving cable, said support being pivotally connected to the tilting member to permit rotation of the support about an axis perpendicular to the tilting axis and which lies in a plane parallel to the principal axis of the cable, a shoe adapted to slide on the cable, means connected to the shoe for pivoting the support about its axis and means for tilting the pivoted member.

6. Cable seam soldering apparatus comprising an induction heating coil, a step-down transformer having a secondary winding connected to the coil, a fixed support plate, a member pivoted on the fixed plate for tilting about an axis perpendicular to that of the cable, a common support for the transformer and coil for holding the coil above the path of a moving cable, said support being pivotally connected to the tilting member to permit rotation of the support about an axis perpendicular to the tilting axis and which lies in a plane parallel to the principal axis of the cable, means for pivoting the support to hold the coil at a predetermined distance from the cable, a cam mounted on the fixed support plate for tilting said member, a motor for driving the cam, manual actuating means for the cam and a slip clutch connected between the motor and the manual actuating means.

7. Cable seam soldering apparatus comprising an induction heating coil, a step-down transformer having a secondary winding connected to the coil, a fixed support plate, a member pivoted on the fixed plate for tilting about an axis perpendicular to that of the cable, a common support for the transformer and coil for holding the coil above the path of a moving cable, said support being pivotally connected to the tilting member to permit rotation of the support about an axis perpendicular to the tilting axis and which lies in a plane parallel to the principal axis of the cable, a shoe adapted to slide on the cable, means connected to the shoe for pivoting the support about its axis, a rotatably mounted shaft on the fixed support plate, a cam on the shaft for tilting said member, a motor for driving the cam shaft and limit switches for the motor controlled by the rotation of the cam.

References Cited in the file of this patent
UNITED STATES PATENTS

| | | |
|---|---|---|
| 2,612,595 | Warren | Sept. 30, 1952 |
| 2,629,812 | Hagopian | Feb. 24, 1953 |